(12) United States Patent
Kim

(10) Patent No.: US 10,406,892 B2
(45) Date of Patent: Sep. 10, 2019

(54) DOOR CURTAIN DEVICE HAVING TRANSMISSIVITY VARIATION STRUCTURE

(71) Applicant: Hyundai Motor Company, Seoul (KR)

(72) Inventor: Dowon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 364 days.

(21) Appl. No.: 15/486,508

(22) Filed: Apr. 13, 2017

(65) Prior Publication Data

US 2018/0134126 A1    May 17, 2018

(30) Foreign Application Priority Data

Nov. 15, 2016    (KR) .................. 10-2016-0152008

(51) Int. Cl.
*B60J 1/04*    (2006.01)
*B60J 1/14*    (2006.01)
*B60J 1/20*    (2006.01)
*B60J 10/75*   (2016.01)
*B60J 5/04*    (2006.01)
(Continued)

(52) U.S. Cl.
CPC ........... *B60J 1/2086* (2013.01); *B60J 1/2038* (2013.01); *B60J 1/2041* (2013.01); *B60J 1/2044* (2013.01); *B60J 1/2047* (2013.01); *B60J 1/2063* (2013.01); *B60J 5/0411* (2013.01); *B60J 5/0412* (2013.01); *B60J 10/75* (2016.02); *B60J 1/04* (2013.01); *B60J 1/08* (2013.01); *B60J 1/17* (2013.01)

(58) Field of Classification Search
CPC ....... B60J 1/025; B60J 1/08; B60J 1/12; B60J 1/14; B60J 1/04; B60J 1/2086; B60J 1/2047; B60J 1/2038; B60J 1/17; B60J 1/0412; B60J 1/2063; B60J 10/75; B60J 5/0411
See application file for complete search history.

(56) References Cited

U.S. PATENT DOCUMENTS 7,475,935 B2 *   1/2009   Ercolano ................ B60J 1/2038
                                                   296/146.7
2004/0020608 A1 *  2/2004  Colson ..................... E06B 9/262
                                                      160/121.1
(Continued)

FOREIGN PATENT DOCUMENTS

DE    10346854 A1 *  5/2005  ............ B60J 1/2044
EP    1304246 A1 *   4/2003  ............ B60J 1/2069
(Continued)

*Primary Examiner* — Phi D A
(74) *Attorney, Agent, or Firm* — Slater Matsil, LLP

(57) ABSTRACT

A curtain device according to an embodiment of the present invention includes a first shade bar. A first shade roller is disposed within the first shade bar and a hook portion is provided in an upper side of the first shade bar. A first curtain member has a first transmissivity. One end of the first curtain member is rolled into the first shade roller and an opposite end of the first curtain member is exposed to a bottom of the first shade bar. A second shade bar is adjacent the bottom of the first shade bar. A second shade roller is configured to be disposed inside a door body that is formed in a lower portion of the door frame. A second curtain member having a second transmissivity has one end connected to the second shade bar and an opposite end rolled into the second shade roller.

20 Claims, 4 Drawing Sheets

(51) Int. Cl.
*B60J 1/08* (2006.01)
*B60J 1/17* (2006.01)

(56) References Cited

U.S. PATENT DOCUMENTS

| | | | |
|---|---|---|---|
| 2007/0074826 A1* | 4/2007 | Jelic | A47H 23/04 |
| | | | 160/84.05 |
| 2007/0187042 A1* | 8/2007 | Kallstrom | E06B 9/88 |
| | | | 160/7 |
| 2007/0262606 A1* | 11/2007 | Schnoblen | B60J 1/2044 |
| | | | 296/143 |

FOREIGN PATENT DOCUMENTS

| KR | 200303611 Y1 | 1/2003 |
|---|---|---|
| KR | 20150019470 A | 2/2015 |

\* cited by examiner

DOOR CURTAIN DEVICE HAVING TRANSMISSIVITY VARIATION STRUCTURE

CROSS-REFERENCE TO RELATED APPLICATIONS

This application claims priority to and the benefit of Korean Patent Application No. 10-2016-0152008 filed in the Korean Intellectual Property Office on Nov. 15, 2016, the entire contents of which are incorporated herein by reference.

TECHNICAL FIELD

Embodiments of the present invention relate to a door curtain device having a transmissivity variation structure.

BACKGROUND

In general, a door curtain is provided in a vehicle to block external light coming into the vehicle through transparent door glass and to protect a passenger's privacy.

A configuration of the door curtain is as follows. A roll is provided in a space between a door panel and a door trim, and lateral ends of the roll are supported by a bracket that is provided in the door panel. In addition, the curtain is rolled into the roll while one end of the curtain is fixed to the roll, and the other end of the curtain is drawn out to the outside through a gap formed in an upper end of the door trim.

When the door curtain is used, the drawn-out end of the curtain is further drawn out as the curtain is unrolled from the roll and then fixed to the door frame. A locking portion is provided in the door frame so as to fix the drawn-out end of the curtain to the door frame and a hook is provided in the drawn-one end of the curtain so as to be hooked in the locking portion.

However, the door curtain needs to be replaced with another door curtain having a different transmissivity so as to change the transmissivity, and it is impossible to change transmissivity of the door curtain while being in use. Accordingly, a device for changing transmissivity of the door curtain according to a user's intension has been researched and studied.

The above information disclosed in this Background section is only for enhancement of understanding of the background of the invention and therefore it may contain information that does not form the prior art that is already known in this country to a person of ordinary skill in the art.

SUMMARY

Embodiments of the present invention relates to a door curtain device having a transmissivity variation structure and provided in a window of a vehicle to improve user's convenience by changing transmissivity of light according to a user's intension.

A curtain device having a transmissivity variable structure according to an exemplary embodiment of the present invention includes a first shade bar. A first shade roller is provided and a hook portion hooked to one side of a door frame is provided in one upper side thereof. A first curtain member has a first transmissivity. One end is rolled into the first shade roller and the other end is exposed to a bottom of the first shade bar. A second shade bar is provided in the other portion of the first curtain member. A second shade roller is disposed inside a door body that is formed in a lower portion of the door frame. A second curtain member has a second transmissivity. One end is connected to the second shade bar and the other is rolled into the second shade roller.

The second shade roller may roll the second curtain member thereinto with a first restoring force by using a force of an elastic member.

The first shade roller may roll the first curtain member with a second restoring force by using a force of an elastic member.

The second restoring force may be higher than the first restoring force.

A docking portion through which the first shade bar and the second shade bar are attached to and separated from each other may be provided, and the docking portion may include a docking protrusion and a docking groove.

The docking protrusion may be provided in an upper side of the second shade bar and the docking groove may be provided in a bottom side of the first shade bar.

A handle may be provided in an upper portion of the first shade bar so as to be pulled up by a user.

A first receiving groove in which the first shade bar is received by being inserted thereinto may be provided in an upper end of the door body, and a second receiving groove in which the second shade bar is received by being inserted thereinto may be provided in a bottom of the first receiving groove.

A width of the second receiving groove may be smaller than a width of the first receiving groove.

Door glass that is disposed vertically movable may be provided in one side of each of the first and second receiving grooves.

A weather strip that realizes a sealing structure with an edge of the door glass when being moved up may be provided in one side of the door frame.

A locking portion that is fastened with the hook portion may be provided in the door frame.

The second shade roller may roll the second curtain member thereinto while being fixed by a bracket that is provided in a fixed manner in the door body.

A door unit according to the exemplary embodiment of the present invention may include a curtain device having a transmissivity variable structure.

A vehicle according to the exemplary embodiment of the present invention may include a curtain device having a transmissivity variable structure.

According to the exemplary embodiment of the present invention, a first curtain member having a relatively low transmissivity and a first curtain member having a relatively high transmissivity are applied to one curtain device such that light transmissivity can be more effectively changed.

In addition, the first shade roller is provided inside the first shade bar, and the second shade bar is attached to the first shade bar or separated from the first shade bar by using the docking portion such that transmissivity can be more simply changed.

Figure 1:
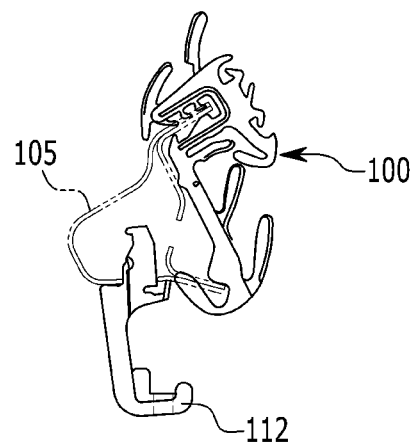
FIG. 1 is a schematic cross-sectional view of a door curtain device having a transmissivity variable structure according to an exemplary embodiment of the present invention.
Figure 1:
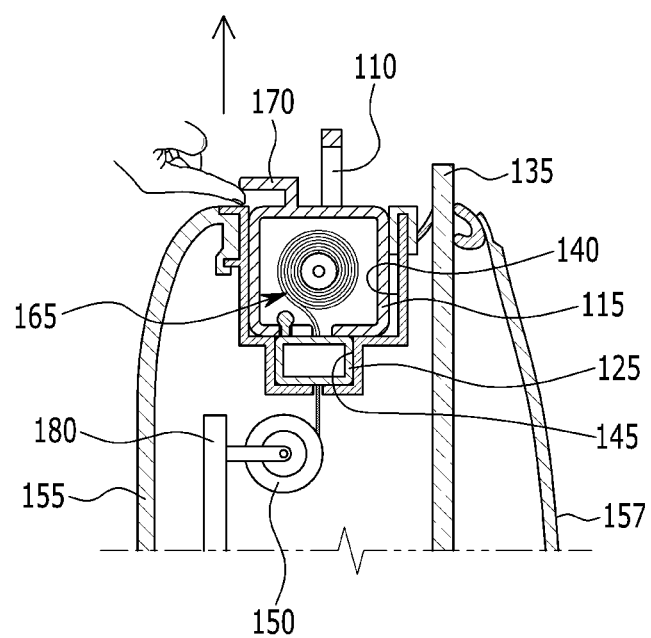

The following reference symbols can be used in conjunction with the drawings.

| | |
|---|---|
| 100: weather strip | 105: door frame |
| 112: locking portion | 110: hook portion |
| 170: handle | 115: first shade bar |
| 165: first shade roller | 160: docking portion |
| 160a: protrusion | 160b: groove |
| 120: first curtain member | 125: second shade bar |
| 130: second curtain member | 135: door glass |
| 150: second shade roller | 157: door panel |
| 155: door trim | 180: bracket |
| 140: first receiving groove | 145: second receiving groove. |

DETAILED DESCRIPTION OF ILLUSTRATIVE EMBODIMENTS

Hereinafter, an exemplary embodiment of the present invention will be described in detail with reference to the accompanying drawings.

Since sizes and thicknesses of each component illustrated in the drawings are arbitrarily represented for convenience in explanation, the present invention is not particularly limited to the illustrated sizes and thicknesses of each component, and the sizes and thicknesses are enlarged in order to clearly express various parts and areas However, contents that are not associated with a description will be omitted in order to clearly describe an exemplary embodiment of the present invention, and components that are the same as or are similar to each other will be denoted by the same reference numerals throughout the present specification.

In addition, in the following detailed description, names of components, which are in the same relationship, are divided into "the first," "the second," and the like to distinguish the components, but the present invention is not limited to the order.

FIG. 1 is a schematic cross-sectional view of a door curtain device having a transmissivity variable structure according to an exemplary embodiment of the present invention.

Referring to FIG. 1, a door curtain device includes a weather strip 100, a door frame 105, a locking portion 112, a door panel 157, a door trim 155, a second shade roller 150, a second receiving groove 145, a second shade bar 125, a first shade bar 115, a first receiving groove 140, door glass 135, a hook portion 110, a handle 170, and a first shade roller 165.

The door glass 135 is disposed to be vertically movable in the door panel 157 between the door trim 155 and the door panel 157, and when the door glass 135 moves upward, an upper edge of the door glass 135 is inserted into one side of the weather strip 100 that is attached to the door frame 105.

The first shade bar 115 is disposed in the door trim 155 between the door trim 155 and the door panel 157, and the second shade bar 125 is disposed below the first shade bar 115.

The handle 170 is disposed in an upper side of the first shade bar 115, and the hook portion 110 is formed in one side of the upper side of the first shade bar 115. In addition, the locking portion 112 is formed in the door frame 105 corresponding to the hook portion 110.

Figure 2:
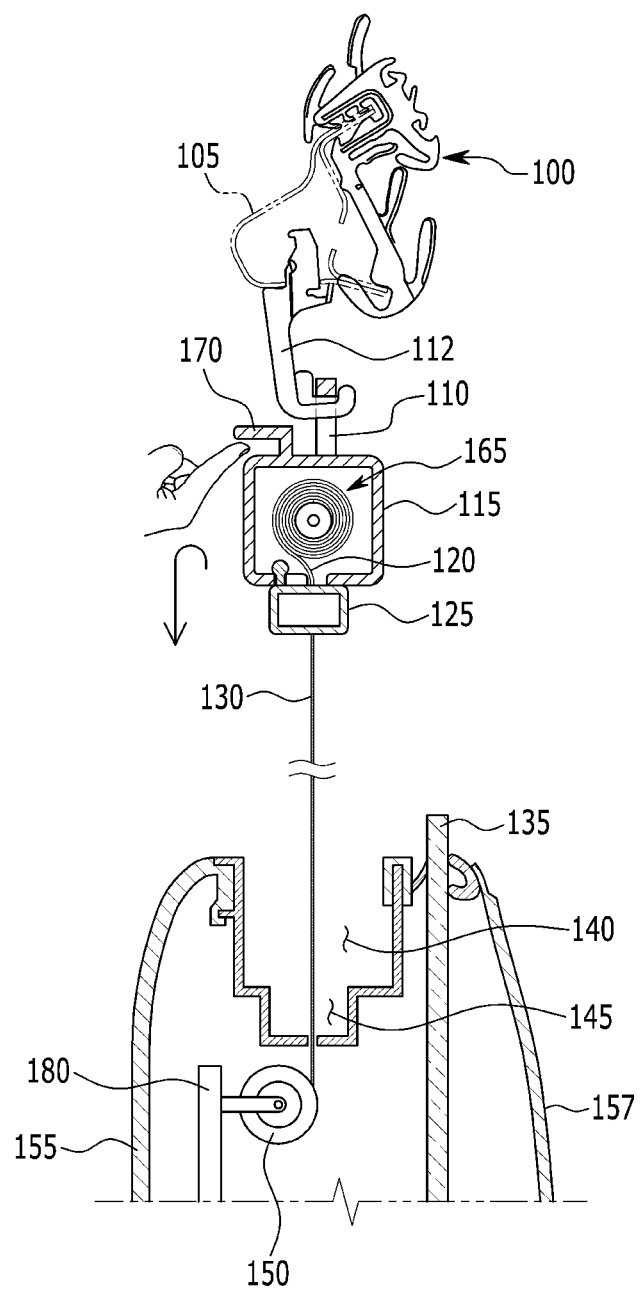
FIG. 2 is a schematic cross-sectional view of a second curtain member in an unrolled state in the door curtain device having the transmissivity variable structure according to the exemplary embodiment of the present invention.

A user holds the handle 170 and lifts up the first shade bar 115 and then the hook portion 110 is locked in the locking portion 112 as shown in FIG. 2.

FIG. 2 is a schematic cross-sectional view of the second curtain member in an unrolled state in the door curtain device having the transmissivity variable structure according to the exemplary embodiment of the present invention.

Referring to FIG. 2, as the second curtain member 130 rolled in the second shade roller 150 is unrolled, the second shade bar 125 and the first shade bar 115 are lifted and the hook portion 110 of the first shade bar 115 is hooked in the locking portion 112.

The second curtain member 130 unrolled from the second shade roller 150 serves as a curtain, and the interior is relatively hardly seen from the outside since the second curtain member 130 has a relatively low transmissivity. Here, a visible ray blocking ration of the second curtain member 130 may be 90%.

In the exemplary embodiment of the present invention, the first shade roller 165 is disposed inside the first shade bar 115, and the first curtain member 120 is rolled into the first shade roller 165. In addition, the first curtain member 120 is connected with the second shade bar 125.

The second shade bar 125 is fastened to the first shade bar 115 through the docking portion 160. Here, the interior is relatively well seen from the outside because the second curtain member 130 has a relatively higher transmissivity than the first curtain member 120. A visible ray blocking ration of the first curtain member 120 may be 10%.

Figure 3:
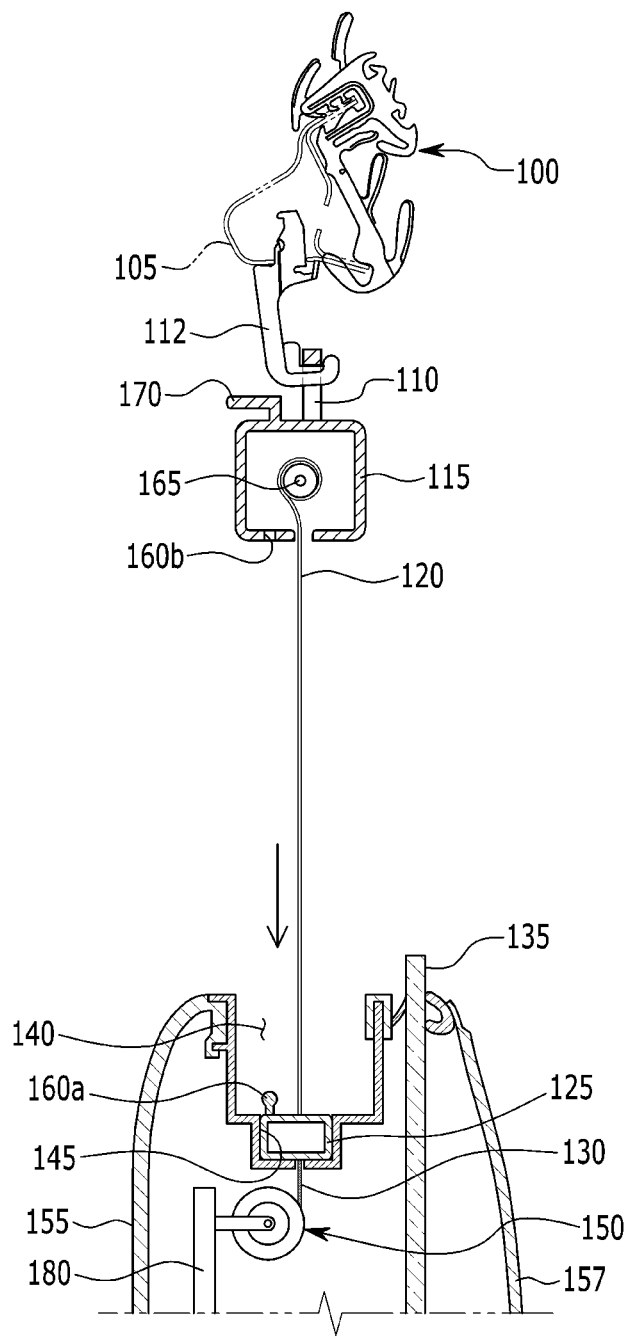
FIG. 3 is a schematic cross-sectional view of a first curtain member in an unrolled state in the door curtain device having the transmissivity variable structure according to the exemplary embodiment of the present invention.

If a user wants a higher transmissivity, the second shade bar 125 is separated from the first shade bar 115 by separating the docking portion 160, and then the second shade bar 125 is moved down as shown in FIG. 3.

FIG. 3 is a schematic cross-sectional view of the first curtain member in an unrolled state in the door curtain device having the transmissivity variable structure according to the exemplary embodiment of the present invention.

Referring to FIG. 3, the first shade roller 165 is disposed in the first shade bar 115, and when the docking portion 160 is separated, the second shade bar 125 is moved down by a restoring force of the second shade roller 150 and then inserted into the second receiving groove 145.

Thus, when the second shade bar 125 is moved down, the second curtain member 130 is rolled into the second shade roller 150 and the first curtain member 120 is unrolled from the first shade roller 165.

Then, the first curtain member 120 unrolled from the first shade roller 165 serves as a curtain, and the interior of the vehicle is relatively well seen from the outside because the first curtain member 120 has a relatively high transmissivity.

In the exemplary embodiment of the present invention, a first restoring force that enables the second shade roller 150 to pull the second curtain member 130 may be set to be greater than a second restoring force that enables the first shade roller 165 to pull the first curtain member 120.

However, although the first restoring force is greater than the second restoring force, the second shade bar 125 is not separated from the first shade bar 115 while the first shade bar 115 is docked through the docking portion 160.

In the exemplary embodiment of the present invention, the first restoring force may be 25N and the second restoring force may be 5N.

Figure 4:
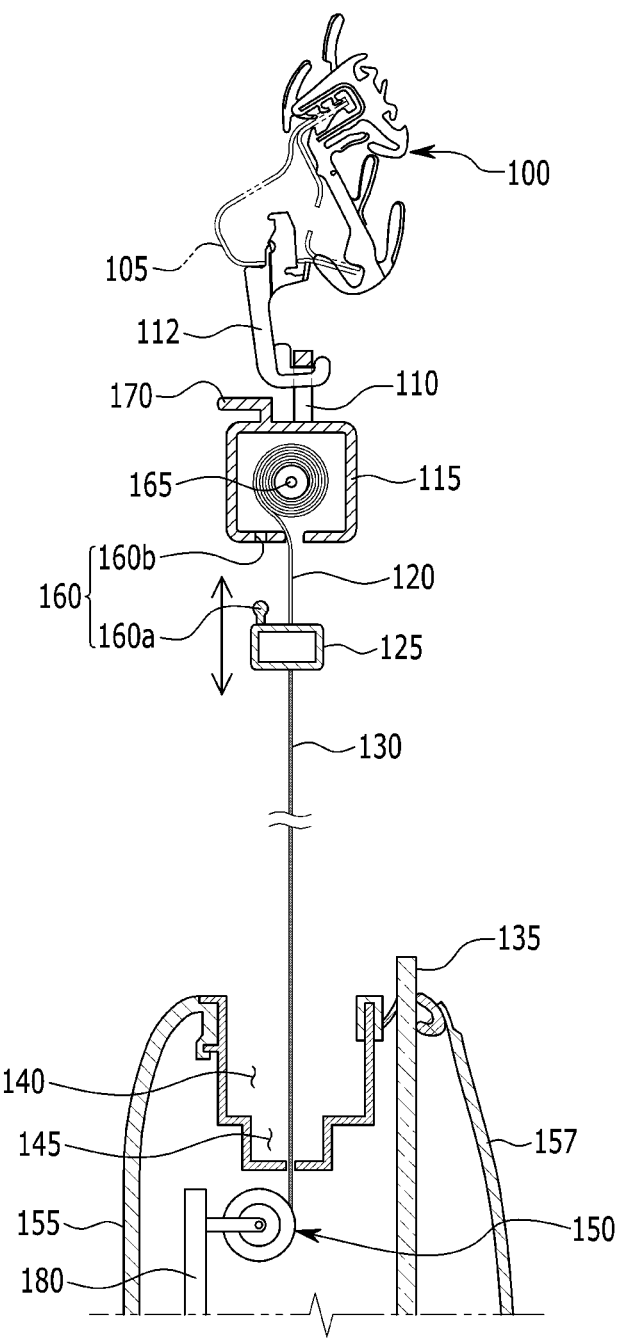
FIG. 4 is a schematic cross-sectional view of a separation state of a first shade bar and a second shade bar in the door curtain device having the transmissivity variable structure according to the exemplary embodiment of the present invention.

FIG. 4 is a schematic cross-sectional view of the first shade bar and the second shade bar in a separated state in the door curtain device having the transmissivity variable structure according to the exemplary embodiment of the present invention.

Referring to FIG. 4, the door curtain device includes the weather strip 100, the door frame 105, the locking portion 112, the hook portion 110, the handle 170, the first shade bar 115, the first shade roller 165, the first curtain member 120, the second shade bar 125, the second curtain member 130, the docking portion 160, the door glass 135, the door panel 157, the door trim 155, the first receiving groove 140, the second receiving groove 145, the second shade roller 150, and a bracket 180, and the docking portion 160 includes a protrusion 160a and a groove 160b.

The weather strip 100 is provided in an outer side of the door frame 105, and the locking portion 112 extends downward in the door frame 105.

The hook portion 110 that is fastened with the locking portion 112 is provided in an one upper side of the first shade bar 115, and the handle 170 is provided in an upper portion of the first shade bar 115 at one side of the hook portion 110.

The first shade roller 165 is disposed inside the first shade bar 115, one end of the first curtain member 120 is fixed to the first shade roller 165, and the first shade roller 165 rolls the first curtain member 120.

The other end of the first curtain member 120 is connected to an upper surface of the second shade bar 125, and a bottom surface of the second shade bar 125 is connected with an upper end of the second curtain member 130.

The protrusion 160a of the docking portion 160 is provided in one upper side of the second shade bar 125, and the groove 160b where the protrusion 160a is fastened by being inserted thereinto is provided in one bottom side of the first shade bar 115.

The second shade roller 150 is disposed in a fixed manner in the door trim 155 by the bracket 180, and the second shade roller 150 rolls a lower portion of the second curtain member 130.

The first receiving groove 140 and the second receiving groove 145 are formed between the door trim 155 and the door panel 157 in an upper portion of the second shade roller 150, the second shade bar 125 is received in the second receiving groove 145 by being inserted thereinto, and the first shade bar 115 is received in the first receiving groove 140 by being inserted thereinto. In addition, the door glass 135 is disposed vertically movable between the first receiving groove 140 and the door panel 157.

As shown in FIG. 4, when the protrusion 160a and the groove 160b of the docking portion 160 are separated from each other, the second curtain member 130 is rolled into the second shade roller 150 by a restoring force of the second shade roller 150, and thus the second shade bar 125 is moved down, and the first curtain member 120 is unrolled from the first shade roller 165 such that the first curtain member 120 serves as a curtain.

When the user lifts the second shade bar 125 to dock the second shade bar 125 to the first shade bar 115, the second shade bar 125 is fixed to the first shade bar 115 by a fastening force of the docking portion 160 such that the second curtain member 130 serves as a curtain.

In the exemplary embodiment of the present invention, the door panel 157 and the door trim 155 may be referred as a single door body, and the first shade roller 165 and the second shade roller 150 are provided to respectively roll the first curtain member 120 and the second curtain member 130 by a restoring force of an elastic member. A structure that the shade roller operates by the elastic member is well known to a person in the art.

The protrusion 160a is formed in the second shade bar 125 in the docking portion 160, and the groove 160b is formed in the first shade bar 115, but the locations of the protrusion 160a and the groove 160b may be switched to each other.

In addition, in FIG. 4, a width of the first receiving groove 140 is larger than a width of the second receiving groove 145, but it may be changed depending on a design specification, and a structure that moves up and down the door glass 135 is well known to a person skilled in the art.

Further, in the exemplary embodiment of the present invention, the door curtain device is applied to a door unit of a vehicle, and may be selectively applied to any vehicle including a bus and any equipment including a window.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A curtain device comprising:
   a first shade bar;
   a first shade roller disposed within the first shade bar;
   a hook portion provided in an upper side of the first shade bar, the hook portion configured to be hooked to one side of a door frame;
   a first curtain member having a first transmissivity, wherein one end of the first curtain member is rolled into the first shade roller and an opposite end of the first curtain member is exposed to a bottom of the first shade bar;
   a second shade bar located adjacent the bottom of the first shade bar;
   a second shade roller configured to be disposed inside a door body that is formed in a lower portion of the door frame; and
   a second curtain member having a second transmissivity, wherein one end of the second curtain member is connected to the second shade bar and an opposite end of the second curtain member is rolled into the second shade roller.

2. The curtain device of claim 1, wherein the second shade roller is configured to roll the second curtain member thereinto with a first restoring force by using a force of an elastic member.

3. The curtain device of claim 2, wherein the first shade roller is configured to roll the first curtain member with a second restoring force by using a force of an elastic member.

4. The curtain device of claim 3, wherein the second restoring force is higher than the first restoring force.

5. The curtain device of claim 1, further comprising a docking portion, wherein the first shade bar and the second shade bar are attached to the docking portion and separated from each.

6. The curtain device of claim 5 wherein the docking portion comprises a docking protrusion and a docking groove.

7. The curtain device of claim 6, wherein the docking protrusion is provided in an upper side of the second shade bar and the docking groove is provided in a bottom side of the first shade bar.

8. The curtain device of claim 1, further comprising a handle disposed in an upper portion of the first shade bar.

9. The curtain device of claim 1, wherein the first shade bar is configured to be received in a first receiving groove in an upper end of the door body by being inserted thereinto, and wherein a second receiving groove is provided in a bottom of the first receiving groove, the second shade bar being configured to be received by being inserted into the second receiving groove.

10. The curtain device of claim 9, wherein a width of the second receiving groove is smaller than a width of the first receiving groove.

11. The curtain device of claim 9, wherein the curtain device is configured so that door glass that is disposed vertically movable is provided in one side of each of the first and second receiving grooves.

12. The curtain device of claim 11, wherein a weather strip that realizes a sealing structure with an edge of the door glass when being moved up is provided in one side of the door frame.

13. The curtain device of claim 1, further comprising a locking portion fastened with the hook portion configured to be provided in the door frame.

14. The curtain device of claim 1, wherein the second shade roller is configured to roll the second curtain member thereinto, the second shade roller being fixed by a bracket configured to be provided in a fixed manner in the door body.

15. A vehicle comprising:
a door frame;
a door body disposed in a lower portion of the door frame; and
a curtain device comprising:
 a first shade bar;
 a first shade roller disposed within the first shade bar;
 a hook portion provided in an upper side of the first shade bar, the hook portion being hooked to one side of the door frame;
 a first curtain member having a first transmissivity, wherein one end of the first curtain member is rolled into the first shade roller and an opposite end of the first curtain member is exposed to a bottom of the first shade bar;
 a second shade bar located adjacent the bottom of the first shade bar;
 a second shade roller disposed inside the door body; and
 a second curtain member having a second transmissivity, wherein one end of the second curtain member is connected to the second shade bar and an opposite end of the second curtain member is rolled into the second shade roller.

16. The vehicle of claim 15, wherein the first shade bar is configured to be received in a first receiving groove in an upper end of the door body, wherein a second receiving groove is provided in a bottom of the first receiving groove, and wherein the second shade bar is configured to be inserted into the second receiving groove.

17. The vehicle of claim 16, further comprising door glass that is vertically movable within the door body, wherein the door glass is provided in one side of each of the first and second receiving grooves.

18. The vehicle of claim 17, further comprising a weather strip that realizes a sealing structure with an edge of the door glass when being moved up in one side of the door frame.

19. The vehicle of claim 15, further comprising a locking portion fastened with the hook portion and located in the door frame.

20. The vehicle of claim 15, wherein the second shade roller is configured to roll the second curtain member thereinto, the second shade roller being fixed by a bracket fixed in the door body.

* * * * *